US012301773B2

(12) United States Patent
Mizoguchi et al.

(10) Patent No.: US 12,301,773 B2
(45) Date of Patent: May 13, 2025

(54) IMAGE PROCESSING APPARATUS TO IMPROVE DOT DISPERSIBILITY WITH N-GRADATION MULTI-VALUED DATA, IMAGE PROCESSING METHOD, AND STORAGE MEDIUM

(71) Applicant: CANON KABUSHIKI KAISHA, Tokyo (JP)

(72) Inventors: Yoshinori Mizoguchi, Tokyo (JP); Akitoshi Yamada, Kanagawa (JP); Hisashi Ishikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/530,000

(22) Filed: Nov. 18, 2021

(65) Prior Publication Data

US 2022/0174181 A1 Jun. 2, 2022

(30) Foreign Application Priority Data

Nov. 30, 2020 (JP) ................. 2020-198747

(51) Int. Cl.
*H04N 1/40* (2006.01)
*H04N 1/405* (2006.01)
*H04N 1/407* (2006.01)

(52) U.S. Cl.
CPC ....... *H04N 1/4053* (2013.01); *H04N 1/40087* (2013.01); *H04N 1/407* (2013.01)

(58) Field of Classification Search
None
See application file for complete search history.

(56) References Cited

U.S. PATENT DOCUMENTS

| 7,203,376 B2 * | 4/2007 | Takahashi | H04N 1/40087 382/274 |
| 8,693,057 B2 * | 4/2014 | Harayama | H04N 1/4051 358/3.05 |
| 8,773,720 B2 * | 7/2014 | Uchidate | H04N 1/4053 358/3.06 |
| 10,771,657 B2 * | 9/2020 | Doi | G06K 15/1878 |
| 2016/0241740 A1 * | 8/2016 | Nakagawa | H04N 1/40087 |

FOREIGN PATENT DOCUMENTS

| JP | 2004314432 A | 11/2004 |
| JP | 2016154326 A | 8/2016 |

* cited by examiner

*Primary Examiner* — Barbara D Reinier
(74) *Attorney, Agent, or Firm* — Canon U.S.A., Inc. IP Division

(57) ABSTRACT

A determination unit determines whether a difference between a maximum value and a minimum value of pixel values of a plurality of pixels in a region of interest in N-gradation multi-valued data, where N≥4, representing the pixel values of the plurality of pixels is less than a determination threshold value. A generation unit generates M-gradation quantization data represented by an M-gradation quantization value, where 3≤M<N, based on the N-gradation multi-valued data and the determination. In a case where the determination unit determines that the difference is less than the determination threshold value, the generation unit generates the M-gradation quantization data so that each of the plurality of pixels corresponding to the region has a value that is one of two consecutive values of the M-gradation quantization values in the generated M-gradation quantization data.

22 Claims, 15 Drawing Sheets

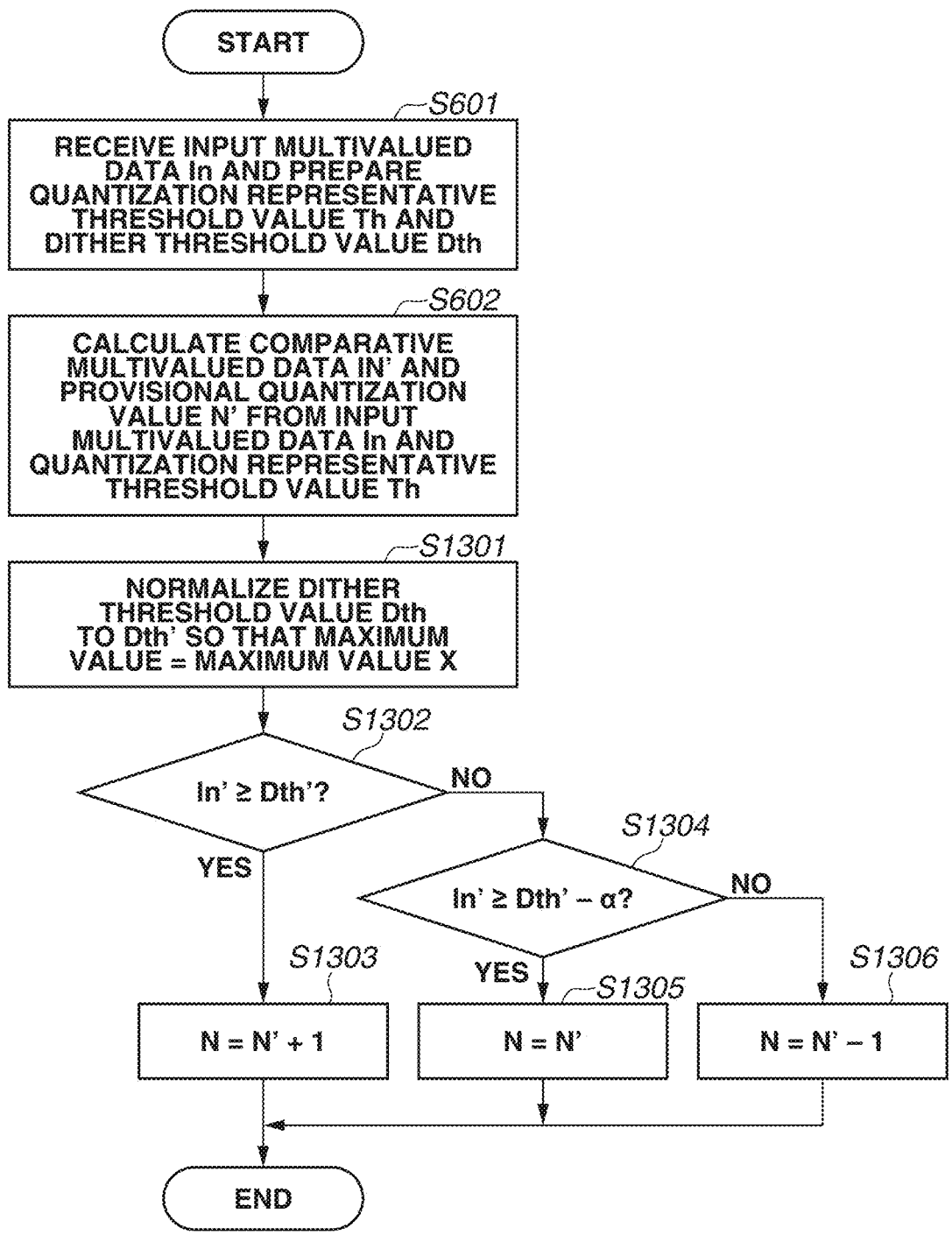

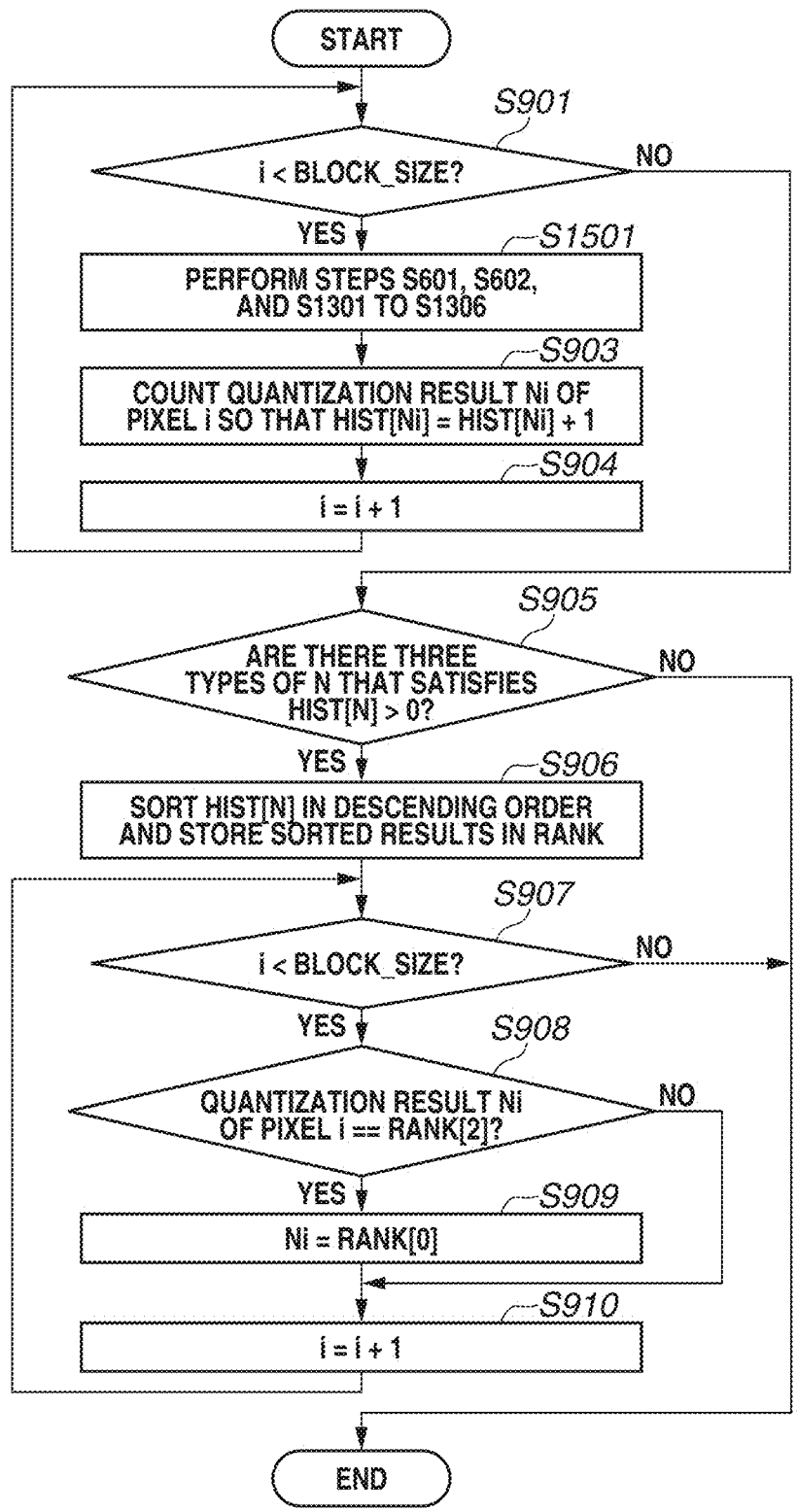

IMAGE PROCESSING APPARATUS TO IMPROVE DOT DISPERSIBILITY WITH N-GRADATION MULTI-VALUED DATA, IMAGE PROCESSING METHOD, AND STORAGE MEDIUM

BACKGROUND

Technical Field

One disclosed aspect of the embodiments relates to an image processing apparatus, an image processing method, and a storage medium for recording an image on a recording medium.

Description of the Related Art

Image recording using a pseudo gradation method requires quantization of multi-value image data, and an error diffusion method and a dither method are known as a quantization image generation method for use in the quantization. Especially in a dither method that determines whether to record a dot by comparing a threshold value stored in advance with a multi-valued data gradation value, the processing load is lower than that of an error diffusion method, so that the dither method is used in many image processing apparatuses.

Meanwhile, inkjet recording apparatuses have been developed to have increased gradations and increased resolution, and there are inkjet recording apparatuses capable of recording dots at a high resolution of 1200 dots per inch (dpi) or 2400 dpi. However, performing all the signal value conversion for generating data recordable by a recording apparatus from image data in a predetermined format at a high resolution of 1200 dpi or 2400 dpi increases the processing load, and this may decrease the throughput. Thus, many recording apparatuses employ a method of performing main image processing at a relatively low resolution of about 600 dpi, performing multi-value quantization on each piece of pixel data into several levels, and then transforming the resulting data into high-resolution binary data.

Various attempts have been made to improve image quality relating to granularity in multi-value quantization using dithering. For example, a threshold value matrix having blue noise characteristics to improve dot dispersibility in "comparing the threshold value with the gradation values of the multi-valued data" has been discussed.

Japanese Patent Application Laid-Open No. 2016-154326 discusses a method for overcoming the effect of granularity caused by equalized levels of quantization results in a pixel region as a result of multi-value quantization.

SUMMARY

One aspect of the embodiments is directed to a technique for preventing an increase in granularity of a recorded image even in a case where image data contains a small pixel value amplitude in a region.

According to an aspect of the disclosure, an image processing apparatus includes a determination unit and a generation unit. The determination unit is configured to determine whether a difference between a maximum value and a minimum value of pixel values of a plurality of pixels in a unit region of interest in N-gradation multi-valued data, where N≥4, representing the pixel values of the plurality of pixels is less than a determination threshold value. The generation unit is configured to generate M-gradation quantization data represented by an M-gradation quantization value, where M<N, based on the N-gradation multi-valued data and the determination by the determination unit. In a case where the determination unit determines that the difference is less than the determination threshold value, the generation unit generates the M-gradation quantization data so that each of the plurality of pixels corresponding to the unit region has a value that is one of two consecutive values of the M-gradation quantization values in the generated M-gradation quantization data.

Further features of the disclosure will become apparent from the following description of exemplary embodiments with reference to the attached drawings.

BRIEF DESCRIPTION OF THE DRAWINGS

FIG. 13 is a flowchart illustrating the steps of a multi-value quantization process according to Japanese Patent Application Laid-Open No. 2016-154326.

FIG. 15 is a flowchart illustrating a quantization boundary correction process according to the third exemplary embodiment.

DESCRIPTION OF THE EMBODIMENTS

Exemplary embodiments of the disclosure will be described below with reference to the drawings. In the following, the term "unit" is used to refer to: (1) a hardware component, a circuit, an apparatus, or a device having a structure that performs the specified function; or (2) a function, a module, a subprogram, a routine, or any software implemented functionality that is performed by a processor executing a program or instructions stored in a memory.

Figure 1:
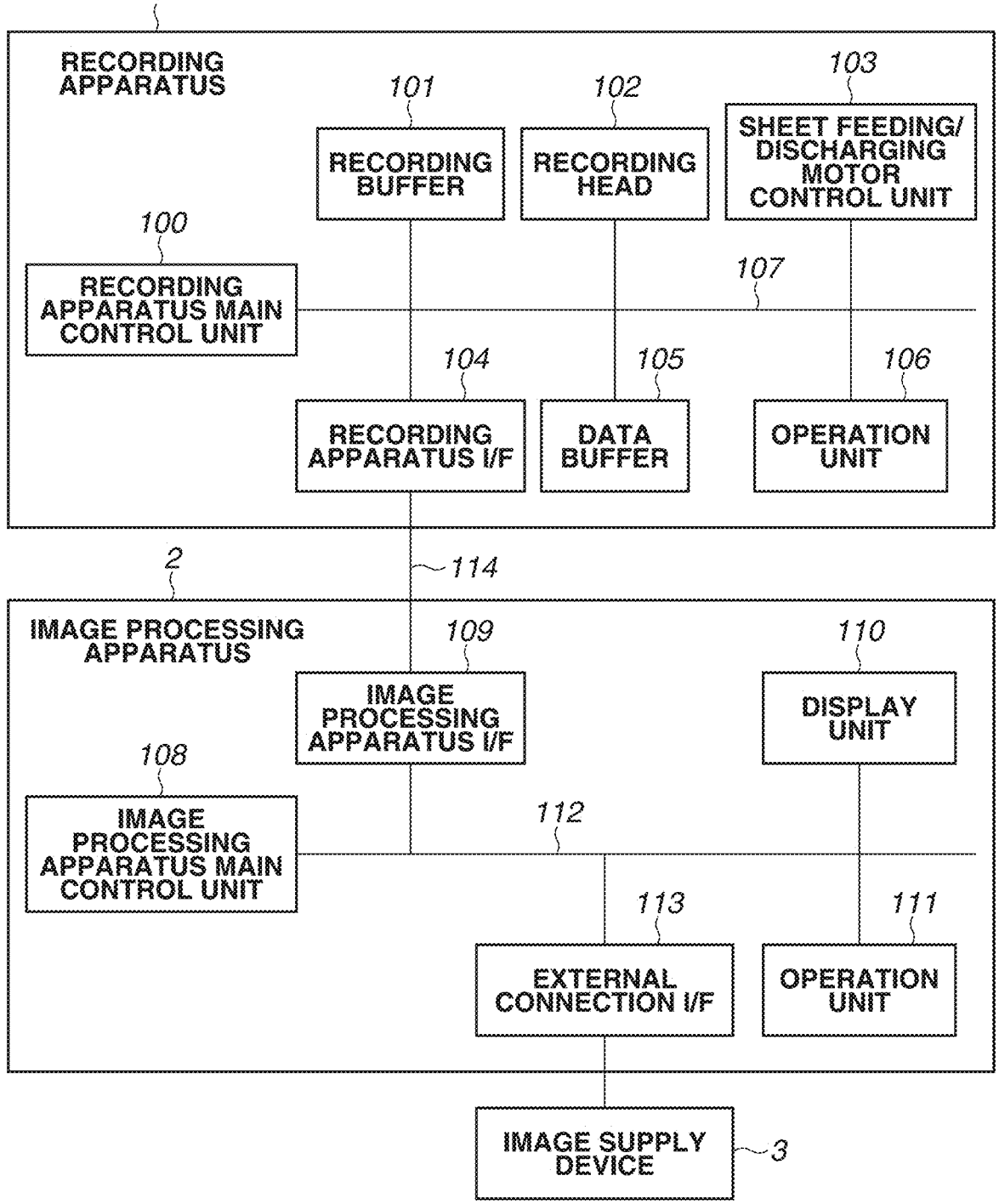
FIG. 1 is a block diagram illustrating a control configuration of an inkjet recording system.

FIG. 1 is an example of a block diagram illustrating a control configuration of an inkjet recording system according to a first exemplary embodiment. The inkjet recording system according to the present exemplary embodiment includes an inkjet recording apparatus 1 (hereinafter, also referred to simply as "recording apparatus"), an image processing apparatus 2, and an image supply device 3. Image data supplied by the image supply device 3 undergoes predetermined image processing by the image processing apparatus 2. Then, the processed image data is transmitted to the recording apparatus 1, and an image is recorded on a recording medium.

In the recording apparatus 1, a recording apparatus main control unit 100 controls the entire recording apparatus 1 and includes a central processing unit (CPU), a read-only memory (ROM), and a random access memory (RAM). A recording buffer 101 stores image data to be transferred to a recording head 102 as raster data. The recording head 102 is an inkjet recording head including a plurality of recording elements capable of discharging an ink as droplets and ejects inks from the recording elements based on image data stored in the recording buffer 101. The recording head 102 according to the present exemplary embodiment includes four recording element rows (hereinafter, also referred to as "nozzle rows") for cyan (C), magenta (M), yellow (Y), and black (K) inks.

A sheet feeding/discharging motor control unit or circuit 103 controls the recording medium conveying and the sheet feeding/discharging and controls the position of a recording medium so that the inks ejected from the recording head 102 land on correct positions on the recording medium. Considering a case where the recording head 102 has a multi-path configuration, motor starting/stopping operations are performed.

A recording apparatus interface (recording apparatus I/F) 104 transmits and receives data signals to and from the image processing apparatus 2. An interface (I/F) signal line 114 connects the recording apparatus I/F 104 and the image processing apparatus 2 to each other. A data buffer 105 temporarily stores image data received from the image processing apparatus 2. An operation unit 106 includes a mechanism via which a developer performs command operations. A system bus 107 connects the functions of the recording apparatus 1 together.

Figure 3:
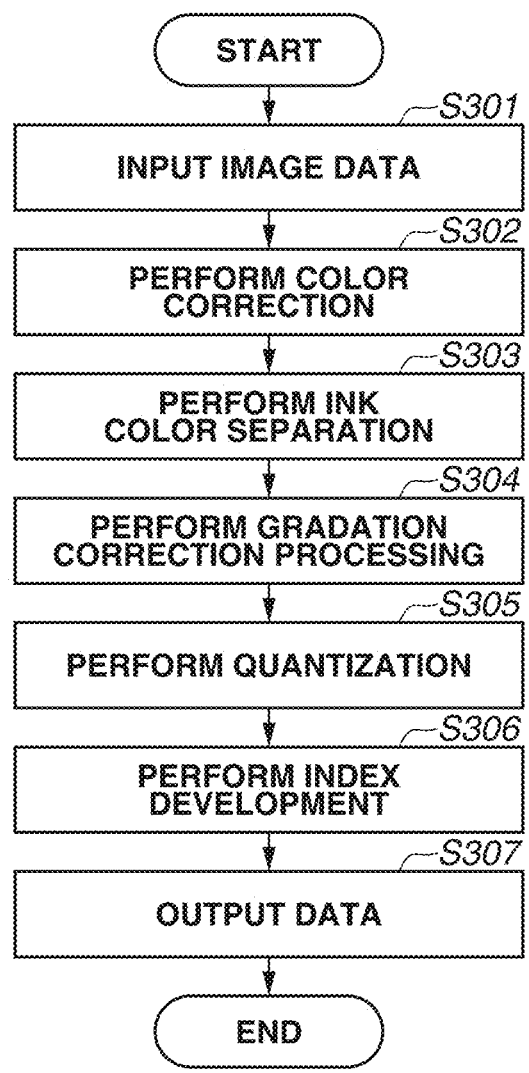
FIG. 3 is a flowchart illustrating image data processing.

Meanwhile, in the image processing apparatus 2, an image processing apparatus main control unit or circuit 108 performs various kinds of processing on an image supplied from the image supply device 3 and generates image data that can be recorded by the recording apparatus 1. The image processing apparatus main control unit or circuit 108 includes a CPU, a ROM, and a RAM. The image processing apparatus main control unit 108 may perform the processing to be performed on the main body of a printer or may preform the processing to be performed on a personal computer (PC) or a smartphone different from the main body of the printer. A quantization configuration according to the present exemplary embodiment in FIG. 4 described below is also included in the image processing apparatus main control unit 108, and a flowchart illustrated in FIG. 3 is executed by the CPU of the image processing apparatus main control unit 108. Further, a lookup table and a threshold value matrix for use in the flowcharts are stored in advance in the ROM of the image processing apparatus main control unit 108 for each recording medium type and for each print mode. An image processing apparatus interface (image processing apparatus I/F) 109 transmits and receives data signals to and from the recording apparatus 1. An external connection interface (external connection I/F) 113 transmits and receives image data to and from the image supply device 3 externally connected. A display unit or panel 110 displays various kinds of information to a user and can be, for example, a liquid crystal display (LCD). An operation unit 111 is a mechanism via which a user performs command operations. For example, a keyboard and a mouse are applicable as the operation unit 111. A system bus 112 connects the image processing apparatus main control unit 108 and the functions together.

Figure 2A:
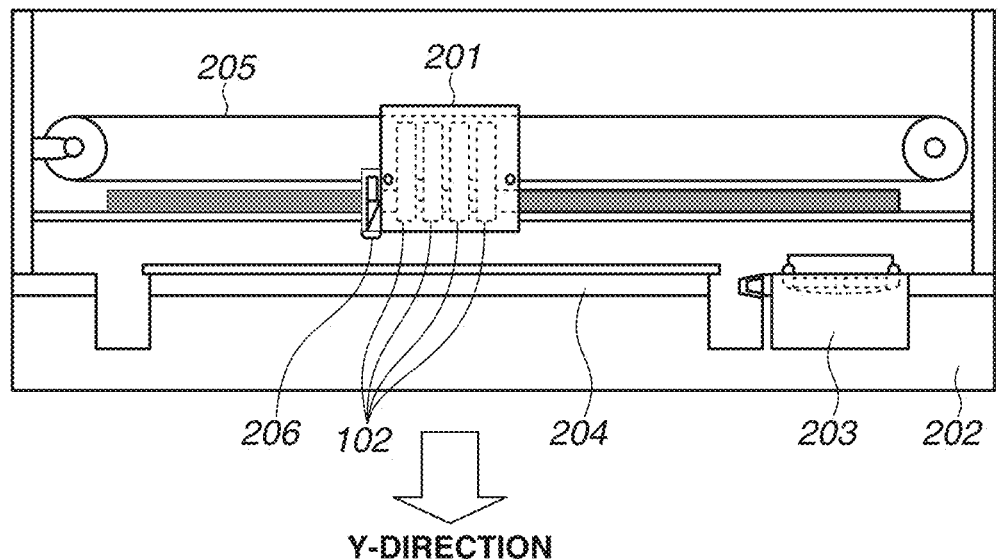
FIGS. 2A and 2B are side cross-sectional views illustrating a configuration of a recording unit of an inkjet recording apparatus.

FIG. 2A is a side cross-sectional view illustrating a configuration of a recording unit of an inkjet recording apparatus for use in the present exemplary embodiment. A carriage 201 on which the recording head 102 including four rows of ejection openings and an optical sensor 206 are mounted can be moved forward and backward in an X-direction specified in FIG. 2A by driving force of a carriage motor transmitted through a belt 205. While the carriage 201 is moved in the X-direction relatively to a recording medium, the recording head 102 ejects inks in a Z-direction based on recorded data so that an image of one scan is recorded on the recording medium placed on a platen 204. An ink ejection operation associated with the relative movement of the recording head 102 and the recording medium will be referred to as "recording scan". After one recording scan ends, the recording medium is conveyed in a Y-direction (conveyance direction) by a distance corresponding to a recording width of one scan. The Y-direction (conveyance direction) intersects with the X-direction in FIG. 2A. The recording scan and the conveyance operation described above are alternately repeated a plurality of times so that an image is recorded little by little on the recording medium.

The optical sensor 206 determines whether a recording medium is on the platen 204 by performing a detection operation while being moved together with the carriage 201. A recovery unit 203 is provided at a position outside the platen 204 and within a region that the carriage 201 can scan.

Figure 2B:
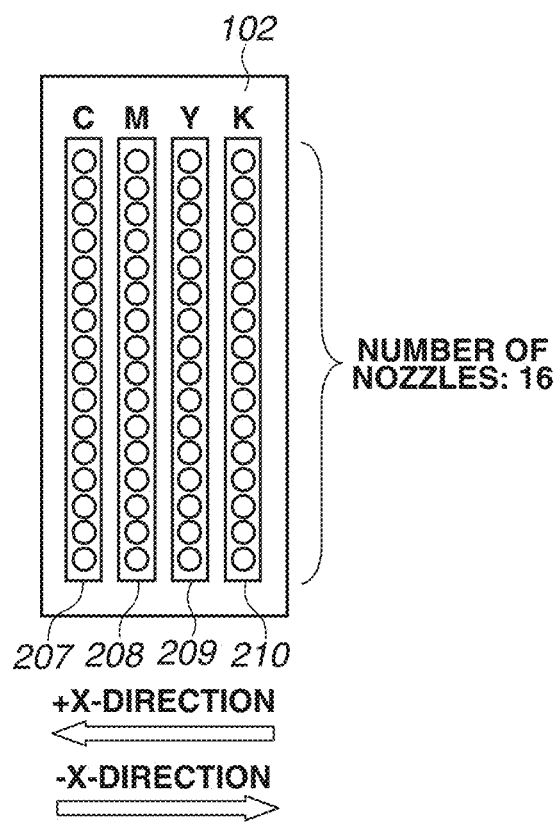

FIG. 2B is a view illustrating the recording head 102 viewed from an ejection opening surface side where the ejection openings are formed.

The recording head 102 includes four ejection opening rows 207 to 210 arranged in parallel in the X-direction.

In each of the ejection opening rows 207 to 210, a plurality of ejection openings (nozzles) for ejecting inks as drops is arranged in the Y-direction at a pitch of 1200 dpi in a predetermined direction. In FIG. 2B, sixteen ejection openings are illustrated. The ejection opening rows 207 to 210 respectively eject cyan (C), magenta (M), yellow (Y), and black (K) inks.

FIG. 3 is a flowchart illustrating image data processing performed by the image processing apparatus main control unit 108. The processing is performed by the CPU of the image processing apparatus main control unit 108 based on a program stored in the ROM or a suitable memory. In step S301, the image supply device 3 inputs image data on a pixel of interest that is a processing target. Then, in step S302, the image processing apparatus main control unit 108 performs color correction processing. The image data that the image processing apparatus 2 receives from the image supply device 3 is red (R), green (G), and blue (B) 8-bit luminance data for expressing a standardized color space such as a standard RGB (sRGB) color space. In step S302, the luminance data is transformed into RGB 8-bit luminance data corresponding to a color space specific to the recording apparatus 1. As to a signal value conversion method, a publicly-known method such as a method of referring to a lookup table (LUT) stored in advance in the ROM can be employed.

In step S303, the image processing apparatus main control unit 108 separates the colors of the transformed RGB data into 8-bit, 256-value gradation data (density data) of each ink color of the recording apparatus 1, i.e., cyan (C), magenta (M), yellow (Y), and black (K). In this step, 8-bit gray images for four channels (four colors) are generated. In ink color separation processing, as in color correction processing, a LUT stored in advance in the ROM can be referred to.

In step S304, the image processing apparatus main control unit 108 performs gradation correction processing on each of CMYK. In general, the number of dots recorded on a recording medium and the optical luminance realized by the number of dots on the recording medium do not have a linear relationship. Thus, in order to change the relationship to a linear relationship, linear transformation is performed on the multi-value color signal data CMYK, and the number of dots to be recorded on a recording medium is adjusted. Specifically, a prepared one-dimensional LUT corresponding to the ink colors is referred to, and the 8-bit, 256-value CMYK is transformed into 8-bit, 256-value C'M'Y'K'.

In step S305, the image processing apparatus main control unit 108 performs predetermined quantization processing on the C'M'Y'K' to transform the C'M'Y'K' into several-bit quantization data. The quantization processing decreases the number of gradations of the image data. For example, in quantization into three values, 256-gradation, 8-bit input multi-valued data of 0 to 255 is transformed into three-value, 2-bit data of 0 to 2. In this example, N=256 and N-gradation is 256-gradation where N is an integer≥4. Since the quantization processing indicates a feature of the present application, details thereof will be described below.

In step S306, the image processing apparatus main control unit 108 performs index development processing. Specifically, one of a plurality of dot arrangement patterns defining the number and position of dots to be recorded for each pixel is selected in association with the quantization value acquired in step S305. Then, in step S307, the dot data is output as binary data. Then, the process ends. While the index development processing that associates a quantization value with a dot pattern on a one-to-one basis is prepared in FIG. 3, in a case where the recording head 102 is capable of recording large and small dots, quantization values of 2 and 1 can be recorded in association with large and small dots, respectively.

Figure 4:
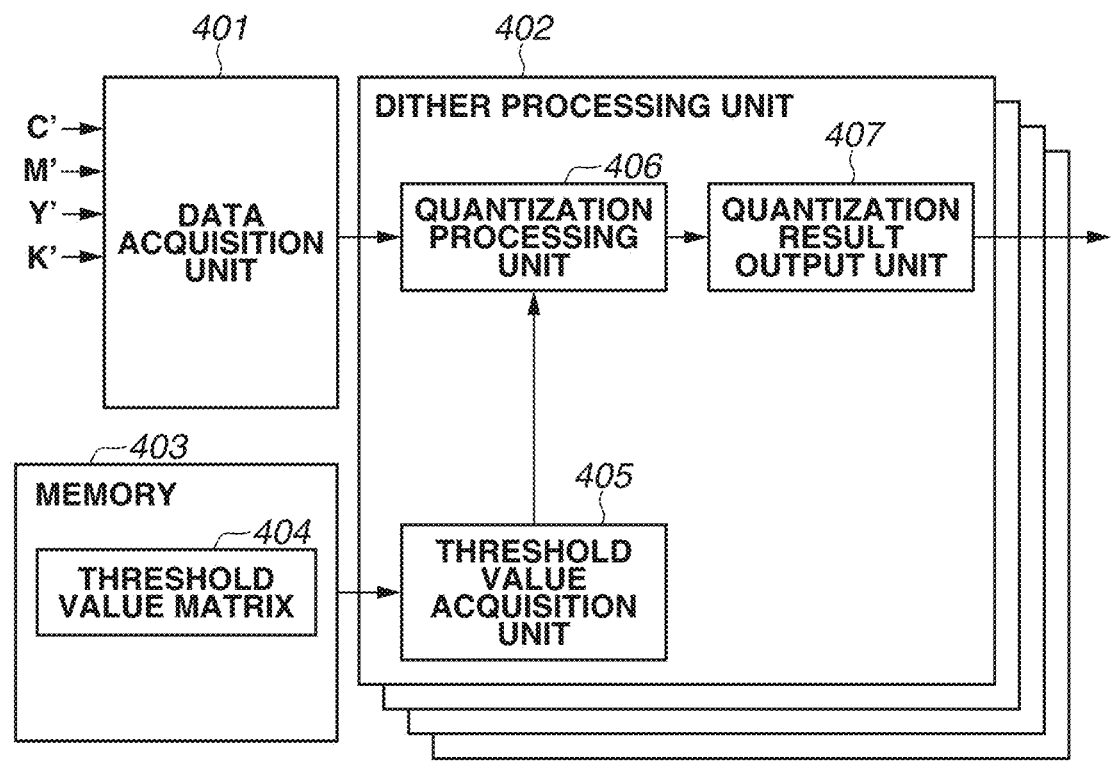
FIG. 4 is a block diagram illustrating details of quantization processing.

FIG. 4 is a block diagram illustrating a system for executing the quantization processing of step S305 in FIG. 3. The quantization processing according to the present exemplary embodiment is performed using a dither method. A data acquisition unit 401 acquires 8-bit multi-value gradation data C'M'Y'K' indicating the density of each pixel for each ink color and transfers the acquired data to a dither processing unit 402. The dither processing unit 402 performs processing on the C'M'Y'K' in parallel, so that processing on input multi-valued data In of one of the colors will be described below.

In the dither processing unit 402, the 8-bit input multi-valued data In to be quantized is directly transmitted to a quantization processing unit 406. On the other hand, a threshold value acquisition unit 405 accesses a memory 403 and acquires the corresponding threshold value matrix 404. A dither threshold value corresponding to the coordinates of the input multi-valued data In is selected from arranged dither threshold values, and the selected dither threshold value is transmitted to the quantization processing unit 406.

The threshold value matrix 404 according to the present exemplary embodiment includes a 4-by-4 pixel region, and dither threshold values of 0 to 127 are arranged therein to form blue noise characteristics. The quantization processing unit 406 performs predetermined quantization processing using the input multi-valued data In and a dither threshold value Dth acquired from the threshold value acquisition unit 405 and outputs multi-value quantization data having a quantization value of 0, 1, or 2 for each pixel.

Figure 5:
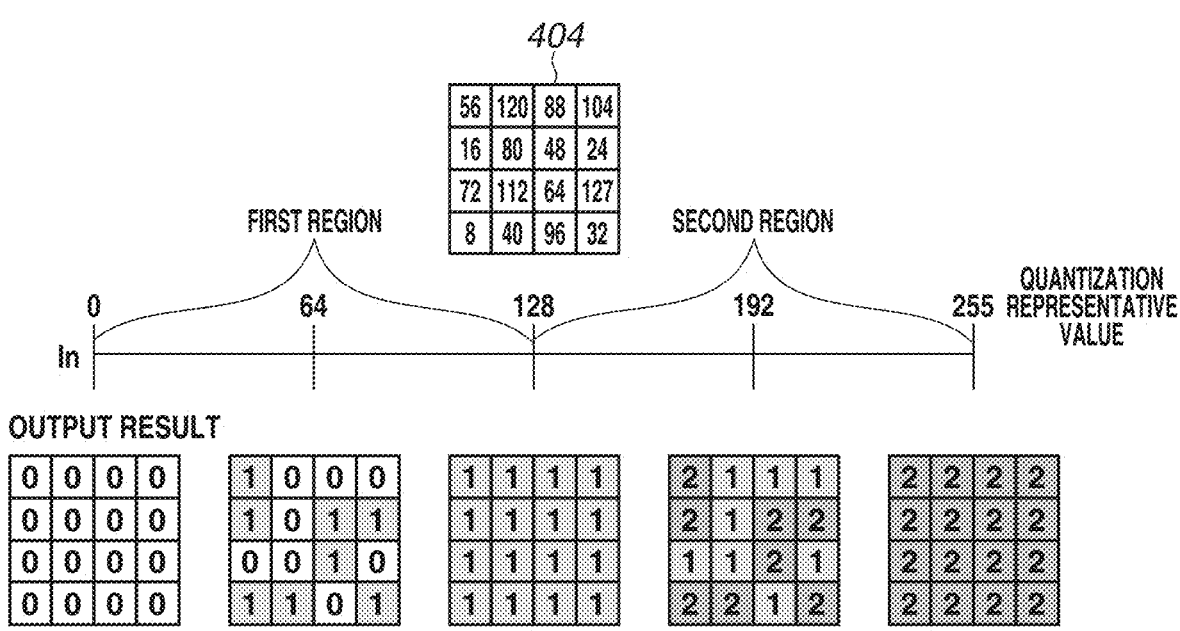
FIG. 5 is a view illustrating an example of multi-value quantization using a threshold value matrix.

FIG. 5 is a diagram illustrating a specific example of multi-value quantization using a threshold value matrix. The multi-value quantization according to the present exemplary embodiment reduces the number of gradations of the multi-valued data In having four or more gradations to generate quantization data having M gradations. M is an integer and is the gradation of the quantization data, and 3≤M<N, based on the N-gradation multi-valued data. In an example illustrated in FIG. 5, the input multi-valued data In having values of 0 to 255 is quantized into three values of levels 0 to 2 using the threshold value matrix 404. In the threshold value matrix 404, the threshold values of 0 to 127 are arranged with high dispersibility in the pixel regions. While the threshold value matrix 404 is illustrated as a four-pixel by four-pixel region in FIG. 5 for simplification, the threshold value matrix 404 includes a region where all the dither threshold values of 0 to 127, at least one for each, are arranged.

In multi-value quantization of the 256-gradation input multi-valued data In into three values, the region (0 to 255) of the input multi-valued data In is divided into a first region (0 to 128) and a second region (129 to 255), and binarization processing is performed on each region using a predetermined threshold value matrix. Then, for the first region, in a case where the input multi-valued data In is greater than the corresponding dither threshold value, the input multi-valued data In is quantized to level 1, whereas in a case where the input multi-valued data In is less than or equal to the dither threshold value, the input multi-valued data In is quantized to level 0. For the second region, in a case where the input multi-valued data In is greater than the corresponding dither threshold value, the input multi-valued data In is quantized to level 2, whereas in a case where the input multi-valued data In is less than or equal to the dither threshold value, the input multi-valued data In is quantized to level 1. As described above, in general multi-value quantization processing, the region of the input multi-valued data In is divided by (L−1), where L is the number of levels after the quantization, and binarization processing is performed on each region to obtain L-level quantization values.

In FIG. 5, a plurality of examples of results of quantization on the input multi-valued data In is illustrated. In a case where In=0, the quantization values of all the pixels are 0. In a case where In=128, the quantization values of all the pixels are 1. In a case where In=255, the quantization values of all the pixels are 2. Further, in a case where 0<In<128, there are two levels of quantization values that are 0 and 1, whereas in a case where 128<In<255, there are two levels of quantization values that are 1 and 2.

The higher the granularity of a recorded image is, the more visible the roughness becomes, and this gives a visually-unpleasant impression. In a case where the input multi-valued data In is 0, 128, or 255, the pixel regions have a uniform quantization value. On the contrary, in a case where the input multi-valued data In is 0<In<128 or 128<In<255, the quantized pixel region includes two types of quantization values. In a case where the same input multi-valued data is arranged in a pixel region of image data, a quantization result includes a maximum of two types of quantization values, and the granularity becomes the highest in a case where there are a maximum of two types of quantization values. On the other hand, the more the quantization values in the surface are smoothed, the lower the granularity is reduced, whereas the greater the difference in level between the quantization values in the surface is, the higher the granularity becomes.

An advantage of the disclosure will be described below. In a case where a multi-value quantization calculation method is used, the granularity may become more visible depending on an input image. For example, a blue sky region in a natural image picture appears to have smooth gradation from blue to bluish white. However, the values in the blue sky region oscillate slightly and is not formed with smooth gradation. Further, in a case where picture data is converted into Joint Photographic Experts Group (JPEG) data, noise in compression may be added, and this also causes invisible oscillation. In quantization processing of the foregoing use case, an output result with high granularity may be generated depending on input image data. Conventional methods are not capable of overcoming the granularity caused by oscillation of pixel values in an image.

Figure 6:
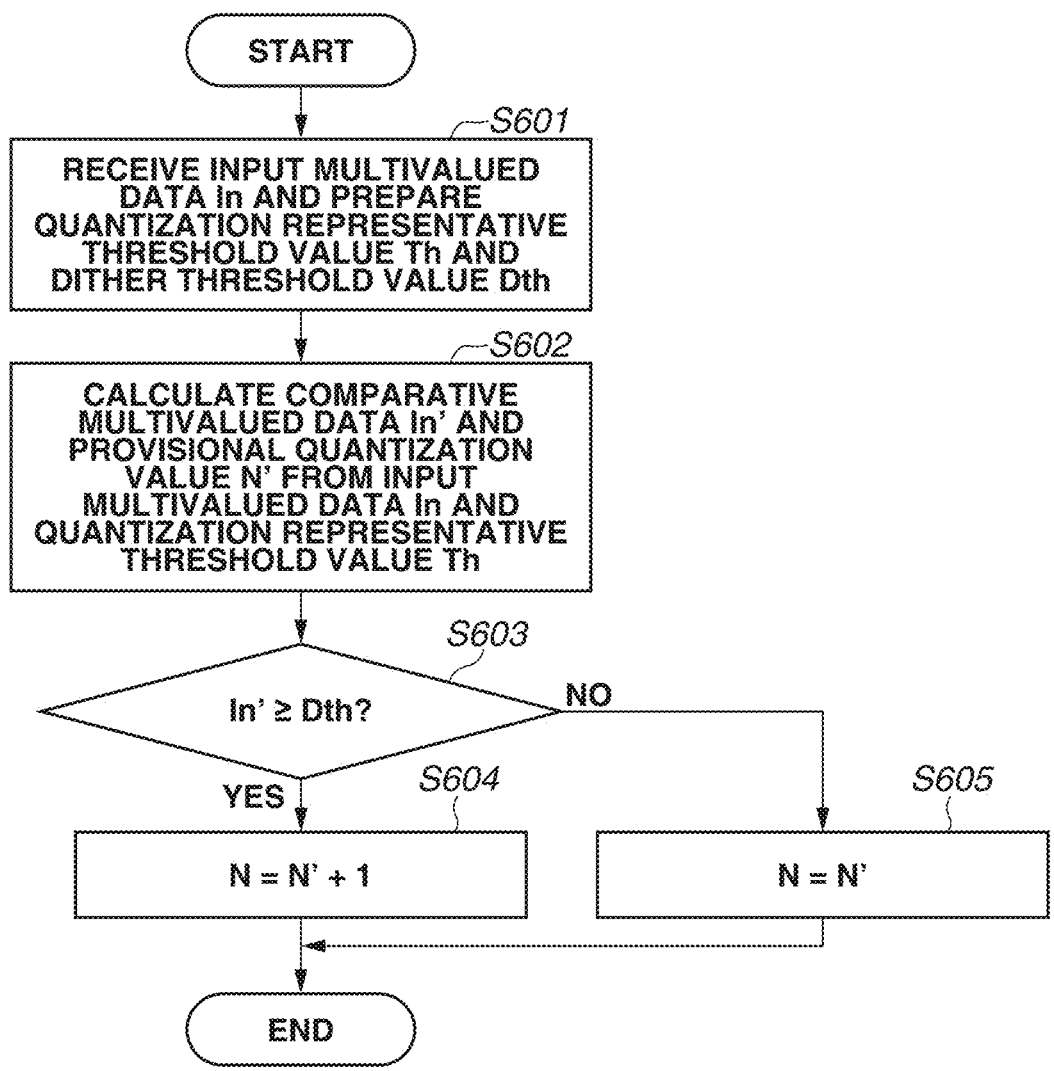
FIG. 6 is a flowchart illustrating a process of general multi-value quantization processing.
Figure 7:
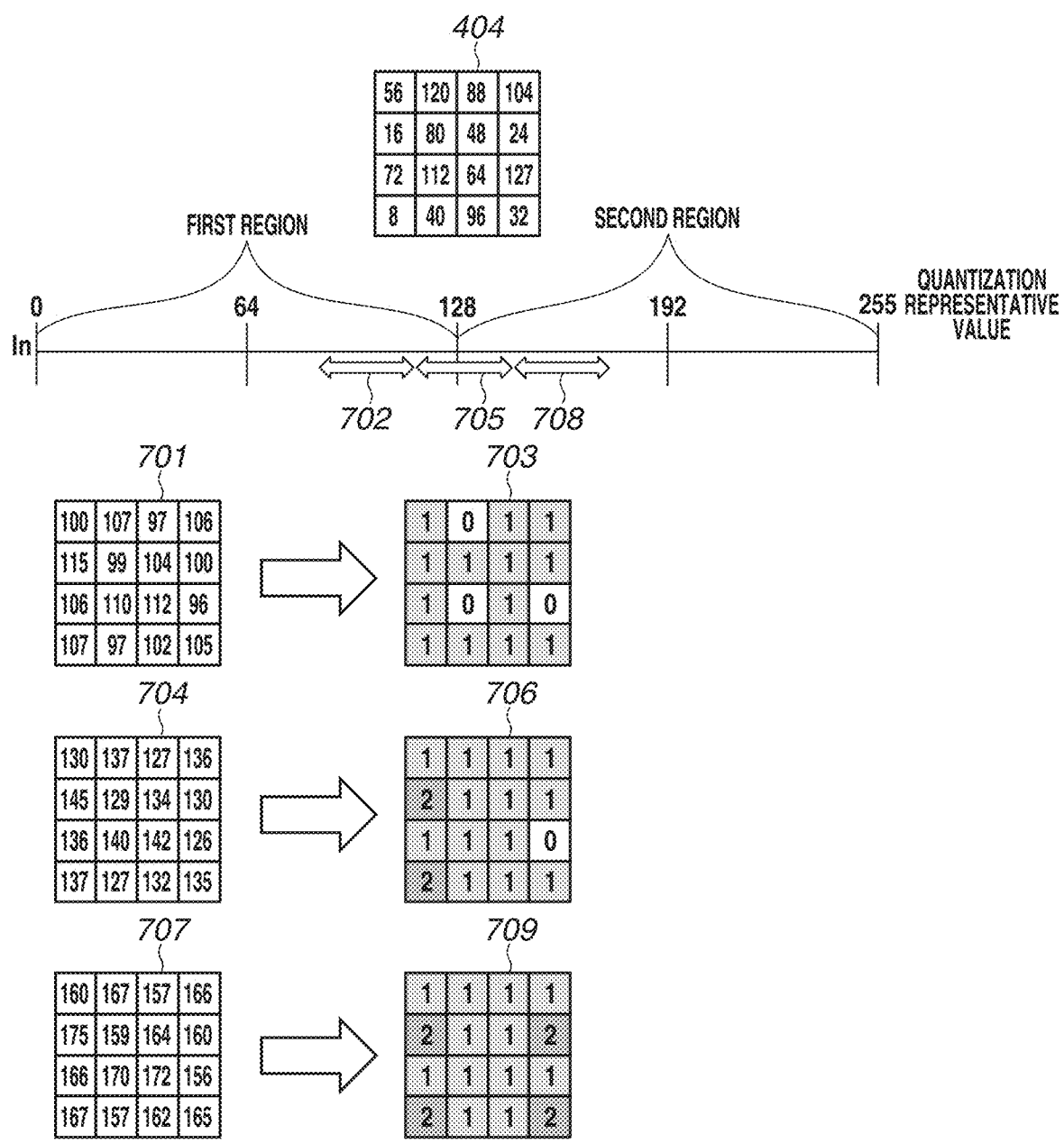
FIG. 7 is a view illustrating an example of a case where granularity increases in multi-value quantization.

FIG. 6 is a flowchart illustrating a process of quantizing one pixel by the quantization processing unit 406 in conventional, general multi-value quantization processing. FIGS. 5 and 7 illustrate a quantization result obtained as a result of executing the process.

In a case where the input multi-valued data In corresponding to one pixel is input, in step S601, the quantization processing unit 406 prepares a quantization representative threshold value Th and the dither threshold value Dth. The quantization representative threshold value Th is a boundary value for splitting the input multi-valued data In into a plurality of regions as described above with reference to FIG. 5, and the value of the quantization representative threshold value Th and the number of quantization representative threshold values Th are determined corresponding to the range of gradations of the input multi-valued data In and the number of levels of quantization values. In a case where the input multi-valued data In having 256 gradations from 0 to 255 is to be quantized into three values (0, 1, 2), the 256 gradations are split into two regions. In a case where the 256 gradations are to be split into equal regions, 256/(3−1)=128 is the quantization representative threshold value Th. Hereinafter, a case where the gradations between a maximum value (255) and a minimum value (0) are to be split into equal regions will be described below as a presumption. Further, the dither threshold value Dth is a value arranged at a position corresponding to the coordinates (x, y) of the input multi-valued data In in the threshold value matrix 404 acquired by the threshold value acquisition unit 405.

In step S602, the quantization processing unit 406 calculates a provisional quantization value N' and a comparative multi-valued data In' using equation (1).

$$In/Th = N' \ldots In' \quad (1).$$

Specifically, the input multi-valued data In is divided by the quantization representative threshold value Th, and the quotient of the division is determined as the provisional quantization value N' and the remainder as the comparative multi-valued data In'. In a case where the gradation region of the input multi-valued data In is to be split into a plurality of regions instead of splitting it into equal regions, the input multi-valued data In is compared with a plurality of predetermined quantization representative values, and the provisional quantization value N' is provisionally determined based on the magnitude relationship.

In step S603, the quantization processing unit 406 compares the comparative multi-valued data In' obtained in step S602 with the dither threshold value Dth. Then, in a case where In'<Dth (NO in step S603), the processing proceeds to step S605. In step S605, the provisional quantization value N' is set as the quantization value (N=N'), and the process ends. On the other hand, in a case where In'≥Dth (YES in step S603), the processing proceeds to step S604. In step S604, a value obtained by adding one to the provisional quantization value N' is set as the quantization value (N=N'+1), and the process ends.

With the conventional multi-value quantization process illustrated in FIG. 6, a state where the granularity of a recorded image increases occurs. This will be described below with reference to FIG. 7.

FIG. 7 is a diagram illustrating a specific example of a case where the granularity of a recorded image increases. In FIG. 7, as in FIG. 5, a case where the input multi-valued data In from 0 to 255 is quantized into three values from level 0 to level 2 using the threshold value matrix 404 is illustrated. Input multi-valued data 701, 704, and 707 each with a four-pixel by four-pixel region are illustrated. The input multi-valued data 701 is distributed in a range 702. The minimum value in the region is 96, and the maximum value in the region is 115. A quantization result 703 is a result of quantizing the input multi-valued data 701 using the threshold value matrix 404.

As to the quantization result 703, a result of 0 or 1 is obtained. The input multi-valued data 704 is distributed in a range 705. The minimum value in the region is 126, and the maximum value in the region is 145. A quantization result 706 is a result of quantizing the input multi-valued data 704 using the threshold value matrix 404. As to the quantization result 706, a result of 0, 1, or 2 is obtained. The input multi-valued data 707 is distributed in a range 708. The minimum value in the region is 156, and the maximum value in the region is 175. A quantization result 709 is a result of quantizing the input multi-valued data 707 using the threshold value matrix 404. As to the quantization result 709, a result of 1 or 2 is obtained.

As described above, the more the quantization values in the surface are smoothed, the lower the granularity is reduced. The difference between the maximum and minimum values in each of the four-pixel by four-pixel regions of the input multi-valued data 701, 704, and 707 is 19. Specifically, the input multi-valued data 701, 704, and 707 are respectively distributed in the narrow ranges 702, 705, and 708 in the possible value range of the 256-gradation input multi-valued data In. The quantization values contained in the quantization result 703 are 0 or 1, and the quantization values contained in the quantization result 709 are 1 or 2. In other words, the pixel regions each contain two types of quantization values. On the contrary, the quantization result 706 contains three types of quantization values that are 0, 1, and 2, and this further increases granularity.

A reason for the increase in granularity in the quantization result 706 obtained by quantizing the input multi-valued data 704 is the region splitting in multi-value quantization. As illustrated in FIG. 7, the values of the input multi-valued data 704 are in the range 705, so that there are pixels with the input multi-valued data 704 greater than the boundary value of 128 used in region splitting and there are also pixels with the input multi-valued data 704 less than the boundary value. A quantization result of a pixel with the input multi-valued data In greater than the boundary value of 128 is definitely level 1 or higher and may become level 2 as a result of a comparison with the dither threshold value Dth. On the other hand, a quantization result of a pixel with the input multi-valued data In less than the boundary value of 128 may become level 1 or level 0 as a result of a comparison with the dither threshold value Dth.

Gradation in a natural image and noise added in compression processing such as conversion into a JPEG cause invisible oscillation. In quantization processing on the foregoing use case, an output result with high granularity may be generated depending on an input image. The amplitude amount of pixel values in a narrow region such as the four-pixel by four-pixel region is small. Thus, in many cases, a region containing a maximum of two types of quantization results such as the quantization result 703 or 709 in FIG. 7 is output. However, in a case where the small amplitude of the pixel values in the narrow region is distributed over the boundary for multi-value quantization region splitting, a region containing three types of values may be output as a quantization result as in the quantization result 706 in FIG. 7. This may result in a recorded image with high granularity.

The present exemplary embodiment provides a method for overcoming the above-described issue. The above-described issue can occur regardless of the number of gradations in multi-value quantization and, furthermore, can occur even in a region larger than or equal to a four-pixel by four-pixel region.

The control according to the present exemplary embodiment will be described below with reference to FIGS. 8, 9A, and 9B. According to the present exemplary embodiment, instead of comparing each pixel unit with the dither threshold value Dth and outputting a quantization result for each unit, determination processing and correction processing are performed on a plurality of pixel units, and a quantization result for each pixel is ultimately output.

Figure 8:
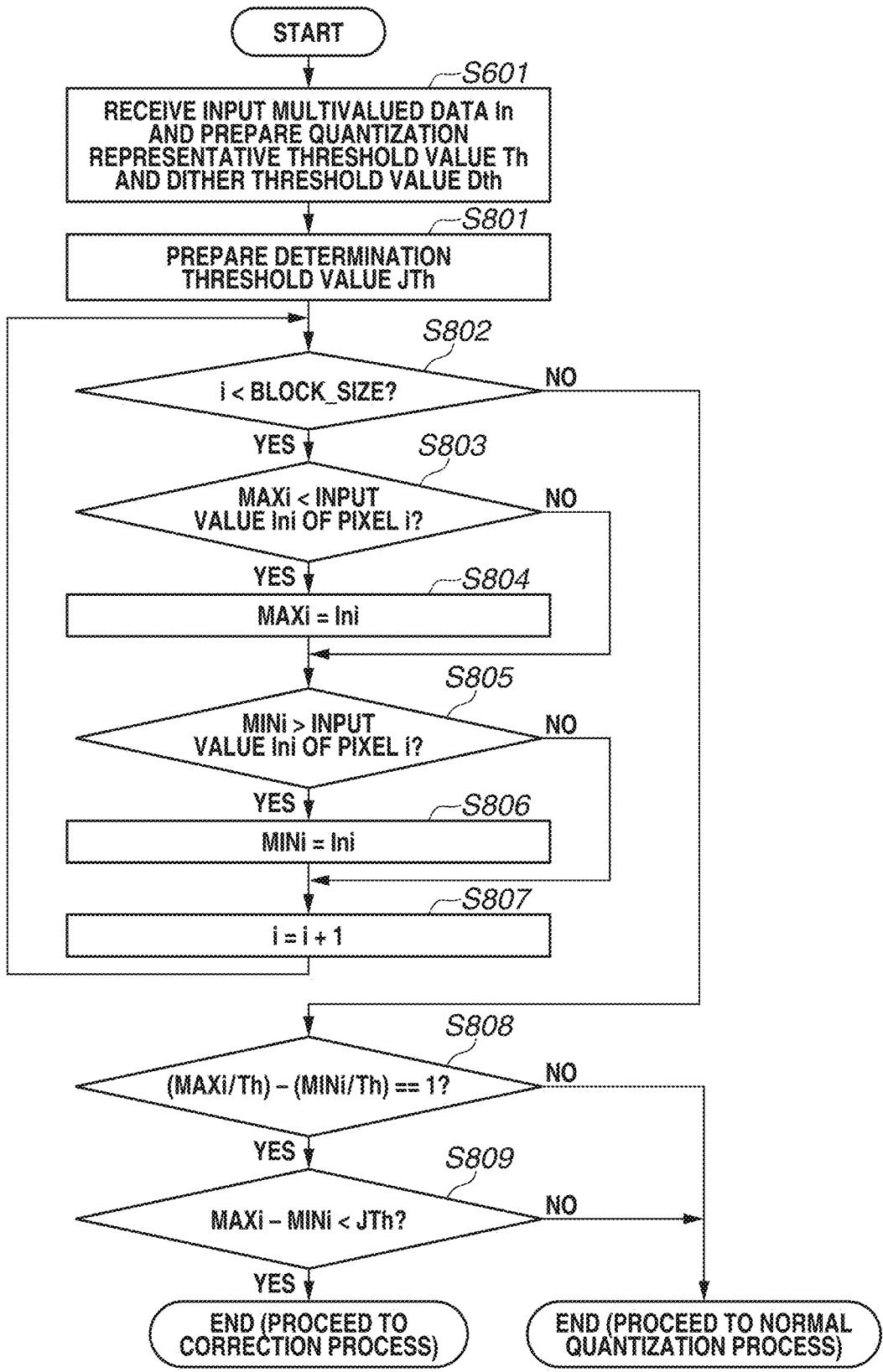
FIG. 8 is a flowchart illustrating a process of determining a quantization boundary.

FIG. 8 illustrates a process of determining whether to perform correction processing, which is a feature of the present exemplary embodiment. Depending on the determination result, a process of the conventional multi-value quantization processing as illustrated in FIG. 6 may be performed.

First, in step S801, a determination threshold value JTh is prepared. The determination threshold value JTh is used in performing determination processing in the process. A value less than the quantization representative threshold value Th acquired in step S601 is set as the determination threshold value JTh. Since the quantization representative threshold value herein is 128, a value less than 128 is set as the determination threshold value JTh. In step S802, loop processing is performed. A loop counter i that functions as a loop counter is initialized to zero in performing the loop. BLOCK_SIZE corresponds to the number of pixels for use in determination processing. According to the present exemplary embodiment, the process is executed using a four-pixel by four-pixel region as a unit region, so that BLOCK_SIZE is 16.

In step S803, MAXi and Ini are compared. Ini is input multi-valued data corresponding to the ith pixel in a region containing a plurality of pixels (hereinafter, the region will be referred to as "plurality-of-pixel region"). MAXi stores the maximum value of the input multi-valued data in the plurality-of-pixel region. In a case where MAXi is less than Ini (YES in step S803), the processing proceeds to step S804. Otherwise (NO in step S803), the processing proceeds to step S805.

In step S804, Ini is assigned to MAXi. Since MAXi is less than Ini in step S803, MAXi is updated with the value of the maximum input multi-valued data in the plurality-of-pixel region.

In step S805, MINi and Ini are compared. MINi stores the value of the smallest input multi-valued data in the plurality-of-pixel region. In a case where MINi is greater than Ini (YES in step S805), the processing proceeds to step S806. Otherwise (NO in step S805), the processing proceeds to step S807.

In step S806, Ini is assigned to MINi. Since MINi is greater than Ini in step S805, MINi is updated with the value of the smallest input multi-valued data in the plurality-of-pixel region.

In step S807, the loop counter i is increased by one. Steps S802 to S807 are looped a number of times corresponding to BLOCK_SIZE.

In step S808, whether the difference between the value obtained by dividing MAXi by the quantization representative threshold value Th and the value obtained by dividing MINi by the quantization representative threshold value Th is one is determined. In this determination, whether the input multi-valued data contained in the plurality-of-pixel region is distributed over two split regions is determined.

Alternatively, the determination in step S808 can be performed using a method other than the method of dividing by the quantization representative threshold value Th. Alternatively, a provisional quantization value N' corresponding to MAXi and a provisional quantization value N' corresponding to MINi are obtained, and the determination is performed based on whether the difference between the obtained provisional quantization values N' is one. As to a method of obtaining quantization values corresponding to MAXi and MINi, in the case of splitting into equal regions and performing quantization, the quantization values can be obtained by a division by the quantization representative threshold value Th or can be obtained based on the magnitude relationship between quantization representative values (0, 128, and 255 in the present exemplary embodiment) corresponding to the predetermined number of gradations after the quantization. For example, the maximum quantization representative value from the plurality of quantization representative values that is less than or equal to the value of MAXi (or MINi) of the multi-valued data is obtained. Then, a quantization value corresponding to the obtained quantization representative value is determined as the provisional quantization value N' of the pixel of interest.

Further, since there is also a case where an interval between the quantized gradation values (quantization value) is not one, in a case where the gradation indicated by the provisional quantization value N' corresponding to MAXi is greater by one than the gradation indicated by the provisional quantization value N' corresponding to MINi, it is determined that the input multi-valued data is distributed over two split regions.

Further, a method of determining whether the input multi-valued data is distributed over two split regions is not limited to the method that includes calculating the provisional quantization value N'. Since the plurality of quantization representative values corresponding to the number of gradations after the quantization is known in advance, the determination can be performed based on the values of MAXi and MINi and the quantization representative values. For example, in a case where a quantization representative value that is less than or equal to MAXi and is a maximum quantization representative value among the plurality of quantization representative values and a quantization representative value that is less than or equal to MINi and is a maximum quantization representative value among the plurality of quantization representative values correspond to two consecutive gradations (in the above-described example, 0 and 128, or 128 and 255), it is determined that the input multi-valued data is distributed over two split regions.

In step S808, in a case where the difference is one, it is determined that the input multi-valued data is distributed over two adjacent split regions (YES in step S808), and the processing proceeds to step S809. On the other hand, in a case where the difference is not one, i.e., in a case where the input multi-valued data is distributed within one split region or the input multi-valued data is distributed over three or more consecutive split regions (NO in step S808), the determination process ends, and the processing proceeds to a normal multi-value quantization process.

In step S809, whether the difference value between MAXi and MINi is less than the determination threshold value JTh is determined. In this determination, whether the amplitude of the pixel values of the plurality-of-pixel region that is determined as being distributed over a plurality of split regions in the step S808, i.e., the difference between the maximum value and the minimum value, is less than or equal to the determination threshold value JTh is determined. The determination threshold value JTh is set to a value by which "a small oscillation of pixel values in a natural image picture" and "a small oscillation of pixel values that occurs due to JPEG noise" described above are discriminated from the others. In an application to the example illustrated in FIG. 7, in order to capture an oscillation (amplitude: 19) in the range 705, the determination threshold value JTh is set to 20. In a case where the difference value is less than the determination threshold value JTh (YES in step S809), the determination process ends, and a quantization correction process that is a feature of the present exemplary embodiment is executed. Details of the quantization correction process will be described below with reference to FIGS. 9A and 9B. Otherwise (NO in step S809), the determination process ends, and the processing proceeds to execute the normal multi-value quantization process.

Figures 9A, 9B:
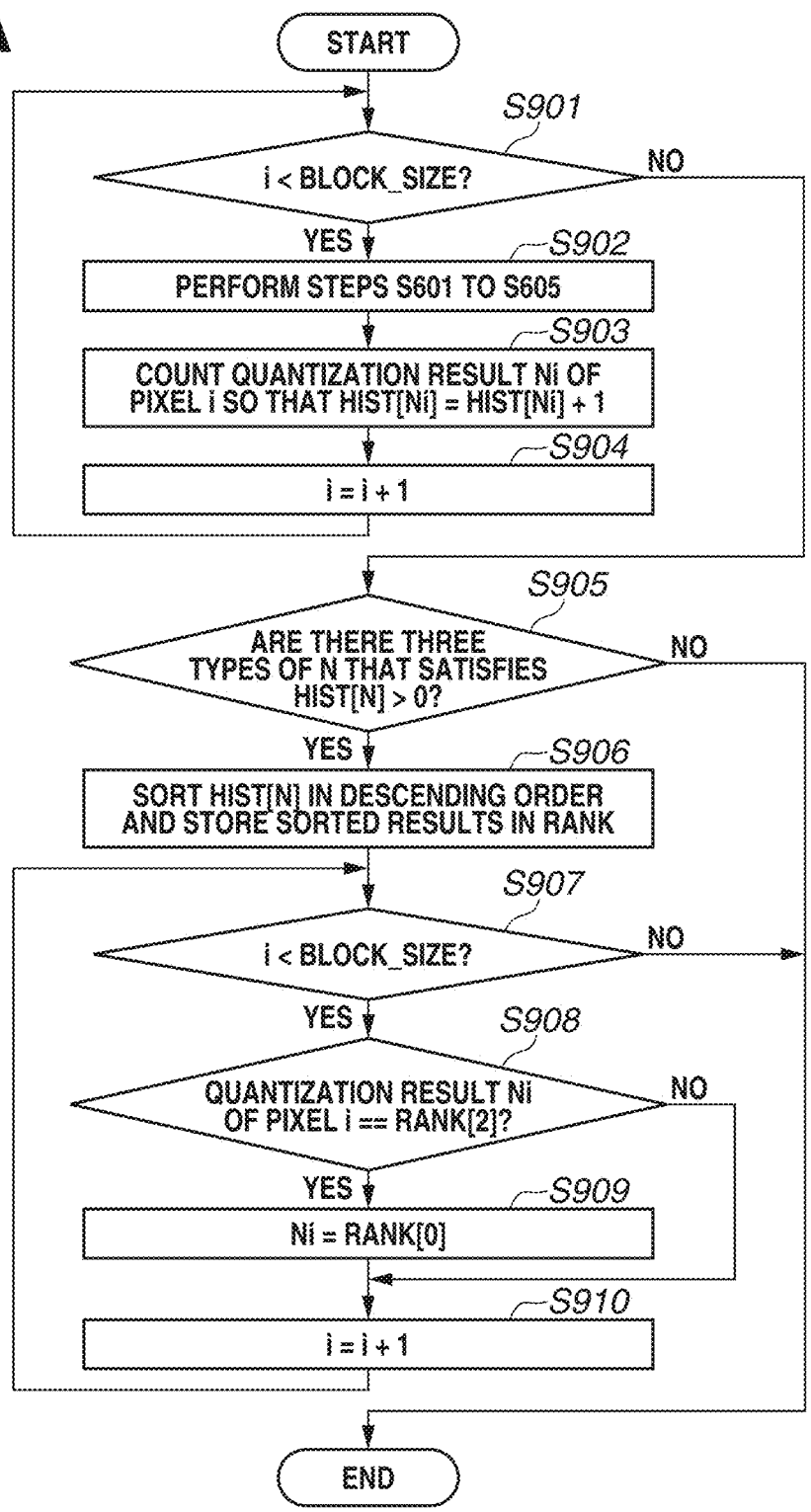
FIG. 9A is a flowchart illustrating a quantization boundary correction process according to a first exemplary embodiment.
FIG. 9B is a diagram supplementing descriptions.

FIGS. 9A and 9B are diagrams illustrating the quantization correction process that is a feature of the present exemplary embodiment. FIG. 9A is a flowchart illustrating the steps of the quantization correction process. The process is executed based on a result of the determination in step S809 in FIG. 8 described above.

In step S901, loop processing is performed. The loop counter i that functions as a loop counter is initialized to zero in performing the loop. BLOCK_SIZE corresponds to the number of pixels for use in quantization correction processing. According to the present exemplary embodiment, the process is executed using a four-pixel by four-pixel region as a unit region, so that BLOCK_SIZE is sixteen.

In step S902, steps S601 to S605 in FIG. 6 described above are performed for the ith pixel. As a result, a quantization result Ni for the ith pixel is output.

In step S903, the quantization result Ni is counted in a histogram HIST.

The histogram HIST has a counter for each quantization level and updates the counter based on the level of the quantization result acquired in step S902. FIG. 9B illustrates an example of a count using the histogram HIST and illustrates count results in a case where BLOCK_SIZE=16. The count results are one pixel for level 0, thirteen pixels for level 1, and two pixels for level 2.

In step S904, the loop counter i is increased by one. Steps S902 to S904 are looped a number of times corresponding to the value of BLOCK_SIZE.

In step S905, determination processing on the count results of the histogram HIST is performed. In this step, whether the output quantization levels of the plurality-of-pixel region include three types of values is determined. In the example illustrated in FIG. 9B, there are pixels that output quantization results of level 0, level 1, and level 2 (YES in step S905), so that the processing proceeds to step S906.

In step S906, the histogram HIST is sorted in descending order of count values, and the sorted histogram HIST is stored in RANK. In the example illustrated in FIG. 9B, the count values of level 1, level 2, level 0, and level 3 decrease in this order, so that the results sorted in the order of "1", "2", "0", and "3" are stored in RANK. At this time, since there are no pixels that output level 3, elimination from RANK may be performed.

In step S907, loop processing is performed. The loop counter i that functions as a loop counter is initialized to zero in performing the loop. BLOCK_SIZE corresponds to the number of pixels for use in quantization correction processing. In a case where process is executed using a four-pixel by four-pixel region as a unit region, BLOCK_SIZE is sixteen.

In step S908, whether the quantization result of the ith pixel is to be corrected is determined. Specifically, whether the quantization result of the ith pixel matches the third quantization result in RANK storing the histogram is determined. In the example illustrated in FIG. 9B, the third quantization result in RANK is "0", so that whether the quantization result of the ith pixel is "0" is determined. In a case where it is determined that the quantization result of the ith pixel matches the third quantization result (YES in step S908), the processing proceeds to step S909, whereas in a case where it is determined that the quantization result of the ith pixel does not match the third quantization result (NO in step S908), step S909 is skipped, and the processing proceeds to step S910.

In step S909, the quantization result of the ith pixel is updated with the first quantization result in RANK storing the histogram. In the example illustrated in FIG. 9B, the first quantization result in RANK is "1", so that the quantization result of the ith pixel is updated with "1".

In step S910, the loop counter i is increased by one. Steps S908 to S910 are looped by a number corresponding to BLOCK_SIZE.

Figure 10:
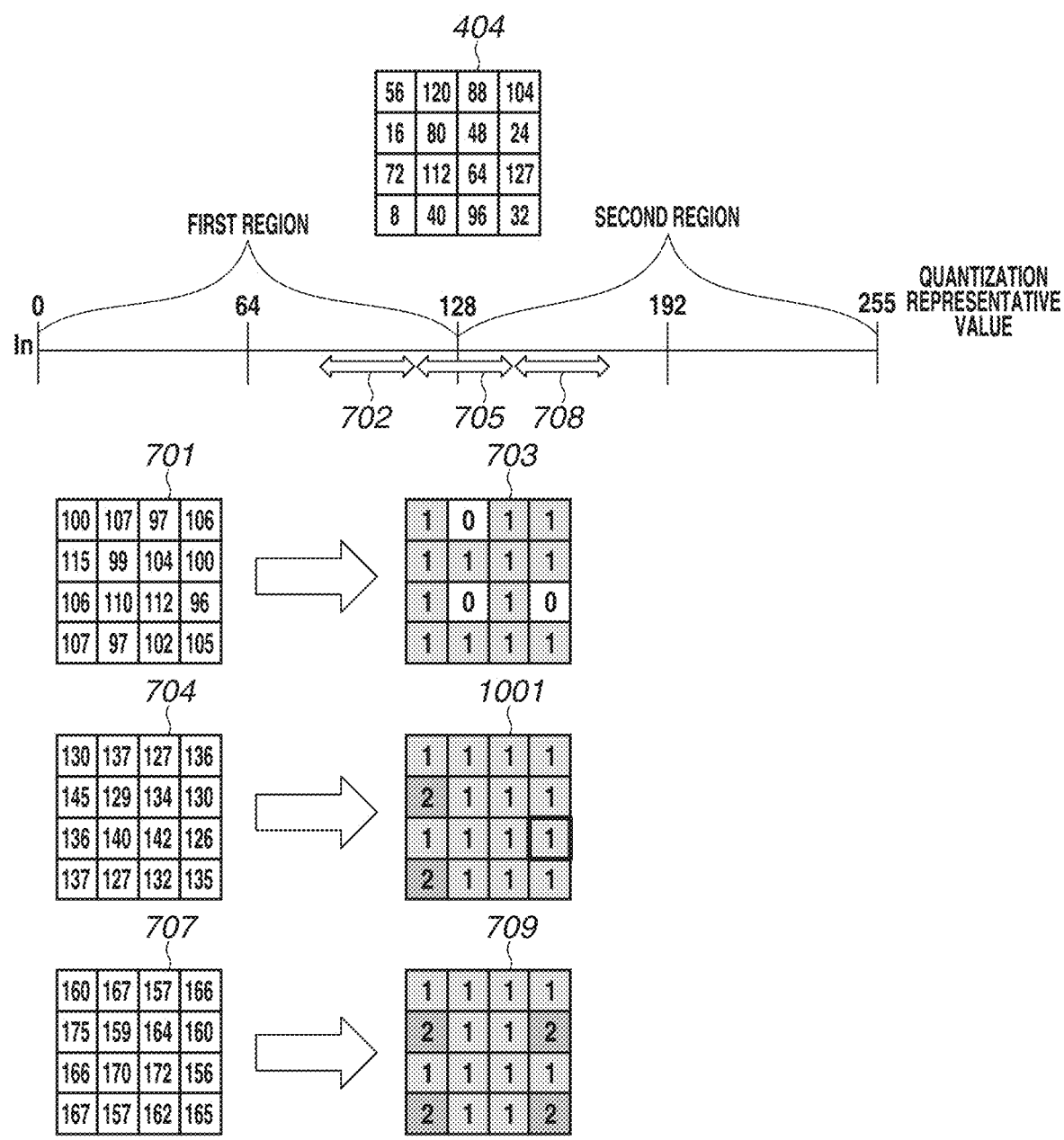
FIG. 10 is a diagram illustrating an example where the quantization boundary correction process according to the first exemplary embodiment is performed.

FIG. 10 illustrates an example of an effect of executing the quantization correction process illustrated in FIGS. 8, 9A, and 9B.

In a case where an image and a threshold value matrix condition are as in FIG. 7, the pixel values of the input multi-valued data 701 and 707 are not distributed over the region splitting boundary as in the ranges 702 and 708. Thus, the normal multi-value quantization as illustrated in FIG. 6 is executed based on the determination process illustrated in FIG. 8. On the other hand, the pixel values of the input multi-valued data 704 are distributed over the region splitting boundary as in the range 705, and the difference between the maximum value and the minimum value is less than the determination threshold value JTh. Thus, the quantization correction process as illustrated in FIGS. 9A and 9B is executed. As a result, not the quantization result 706 (FIG. 7) of the conventional multi-value quantization process but a quantization result 1001 is output as a quantization result after the quantization correction process. In the quantization result 1001, level 0 is updated with level 1, so that the number of types of quantization values contained in the plurality-of-pixel region is corrected from 3 (three types) to 2 (two types).

As a result, there are two patterns that are a region over the region splitting boundary and a region not over the region splitting boundary, and the granularity of each pixel region is smoothed compared to the case where there are three patterns, whereby the granularity of a recorded image is improved.

As described above, according to the present exemplary embodiment, the determination process and the quantization correction process are executed so that a region including three types of quantization values due to a small oscillation of pixel values is processed to include two types of quantization values. As a result, the image where a small oscillation of pixel values occurs includes quantization values in two patterns that are one type and two types, and the granularity of the image recorded by the inkjet recording apparatus appears to be improved to the user.

According to the present exemplary embodiment, it is desirable to update the three quantization results with quantization results corresponding to two consecutive gradation values, so that the method in which the third one is selected does not have to be employed. The number of minimum values and the number of maximum values of three quantization results are compared to determine which one of the numbers is greater, and the result that is less in number is updated to be changed to the median value to obtain a combination of the value of the greater one and the median value.

While the normal quantization from step S601 to step S605 is performed and thereafter the quantization results are corrected to two types in the quantization correction process in FIGS. 9A and 9B, a method and an execution order are not limited to those described above.

An example of limiting a plurality-of-pixel region to two types of quantization results without calculating a quantization result is a limiting process. In the limiting process, two types of quantization results are predetermined based on a distribution of pixel values In. The input multi-valued data 704 indicates that the mean value of the sixteen pixels of the input data is 133, so that quantization results are predetermined to have two types that are level 1 and level 2 based on the quantization representative threshold value Th and the mean value. After the quantization results are determined, each pixel having a pixel value In less than the quantization representative threshold value Th is updated so that the pixel value In is updated with the quantization representative threshold value Th. In the case illustrated in FIG. 10, the input multi-valued data 704 includes pixels having pixel values of "127" and "126". The pixel values are updated with the quantization representative threshold value Th=128. Since the updated pixel values are 128, the quantization levels are definitely 1. The quantization results are limited to the predetermined two types of quantization results without correction after the multi-value quantization results are calculated.

According to the above-described exemplary embodiment, two types of quantization results are in the plurality-of-pixel region, so that the granularity is improved, but there is an issue that the density in the plurality-of-pixel region changes. As to the quantization results 706 and 1001 obtained from the input multi-valued data 704, the quantization result 1001 is improved from the point of view of granularity.

However, since the pixel that outputs level 0 in the quantization result 706 outputs level 1 in the quantization result 1001, the density in the region is higher in the quantization result 1001. As a value of the input multi-valued data in the region increases, a quantization result naturally increases. However, implementing the first exemplary embodiment sometimes causes a density inversion in a blue-sky gradation region as a result of the determination process in FIG. 8.

In the present exemplary embodiment, a method for maintaining a density while improving granularity to solve the issue that a density inversion occurs as a result of improving granularity will be described below.

Figure 11:
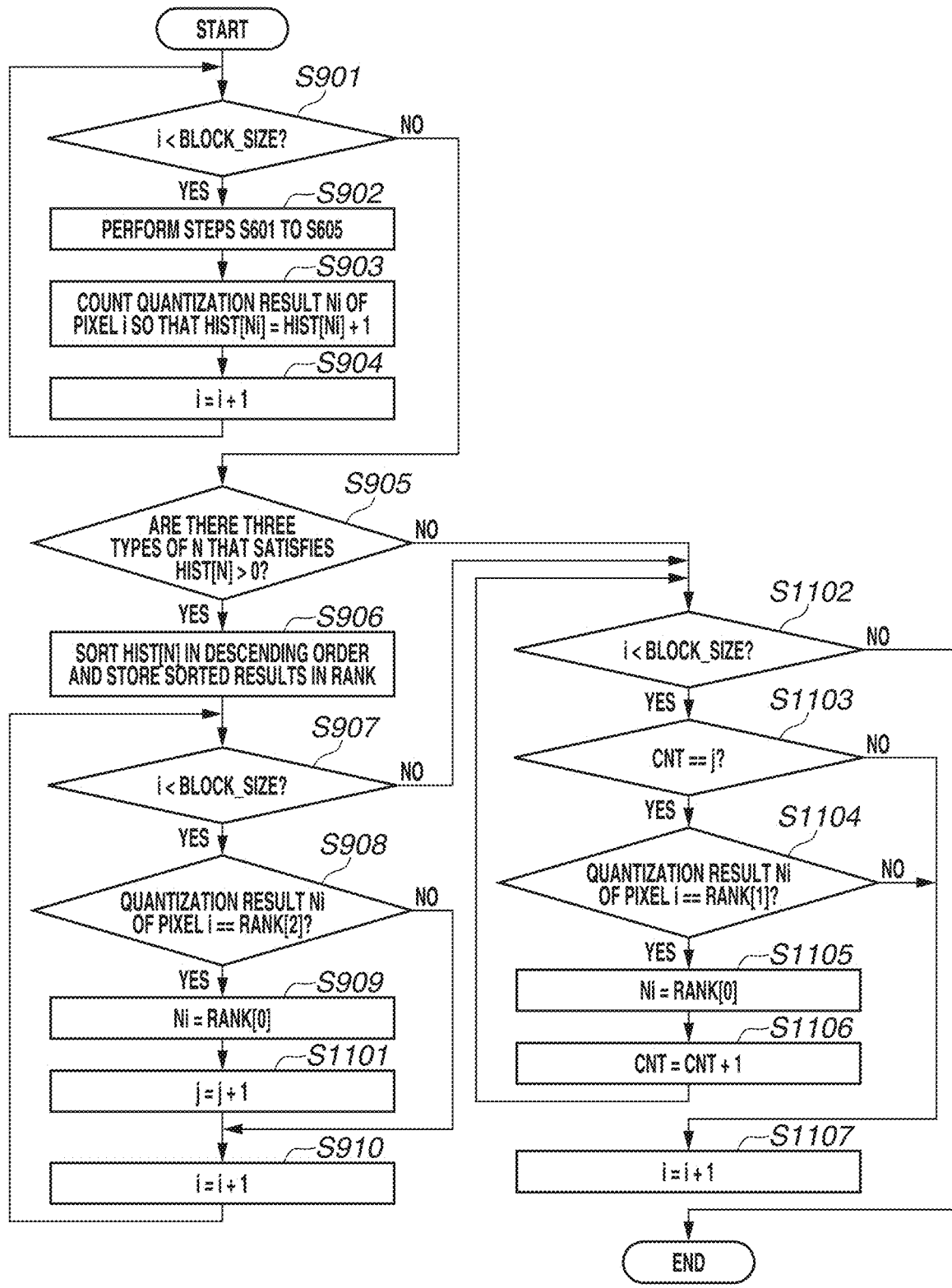
FIG. 11 is a flowchart illustrating a quantization boundary correction process according to a second exemplary embodiment.

FIG. 11 illustrates a quantization correction process that is a feature of the present exemplary embodiment. The present exemplary embodiment is implemented based on the determination result of step S809 in the determination process in FIG. 8. Redundant descriptions of the steps in the flowchart that are described above in the first exemplary embodiment are omitted.

In step S1101, a variable number j is increased by one. The variable number j is increased by the number of pixels of the quantization results that are updated, and the variable number j is used in a subsequent process to maintain the density in the present exemplary embodiment. The variable number j is initialized to zero in executing the flowchart in FIG. 11.

In step S1102, loop processing is performed. The loop counter i that functions as a loop counter is initialized to zero in performing the loop. BLOCK_SIZE corresponds to the number of pixels for use in quantization correction processing. In a case where process is executed using a four-pixel by four-pixel region as a unit region, BLOCK_SIZE is sixteen.

In step S1103, a variable number CNT and the variable number j are compared. The variable number CNT is initialized to zero in executing the flowchart in FIG. 11. The variable number CNT is increased by the number of pixels of quantization results that are updated to maintain the density. In this step, whether the quantization results of the pixels are updated by the value of the variable number j that is counted in advance is determined.

In step S1104, whether the quantization result of the ith pixel is to be updated is determined. Specifically, whether the quantization result of the ith pixel matches the second quantization result in RANK storing the histogram is determined. In the example illustrated in FIG. 9B, the second quantization result in RANK is two. Thus, whether the quantization result of the ith pixel is two is determined. In a case where it is determined that the quantization result of the ith pixel matches the second quantization result (YES in step S1104), the processing proceeds to step S1105, whereas in a case where it is determined that the quantization result of the ith pixel does not match the second quantization result (NO in step S1104), step S1105 is skipped, and the processing proceeds to step S1107.

In step S1105, the quantization result of the ith pixel is updated with the first quantization result in RANK storing the histogram. In the example illustrated in FIG. 9B, the first quantization result in RANK is one. The quantization result of the ith pixel is updated with one. The process is configured so that the quantization result is updated in the negative direction in step S1105 in a case where the quantization result is updated in the positive direction in step S909 whereas the quantization result is updated in the positive direction in step S1105 in a case where the quantization result is updated in the negative direction in step S909.

In step S1106, the variable number CNT is increased by one. The variable number CNT is increased by the number of pixels whose quantization result is updated in step S1101 or thereafter.

In step S1107, the loop counter i is increased by one. Steps S908 to S910 are looped by the number of BLOCK_SIZE.

Figure 12:
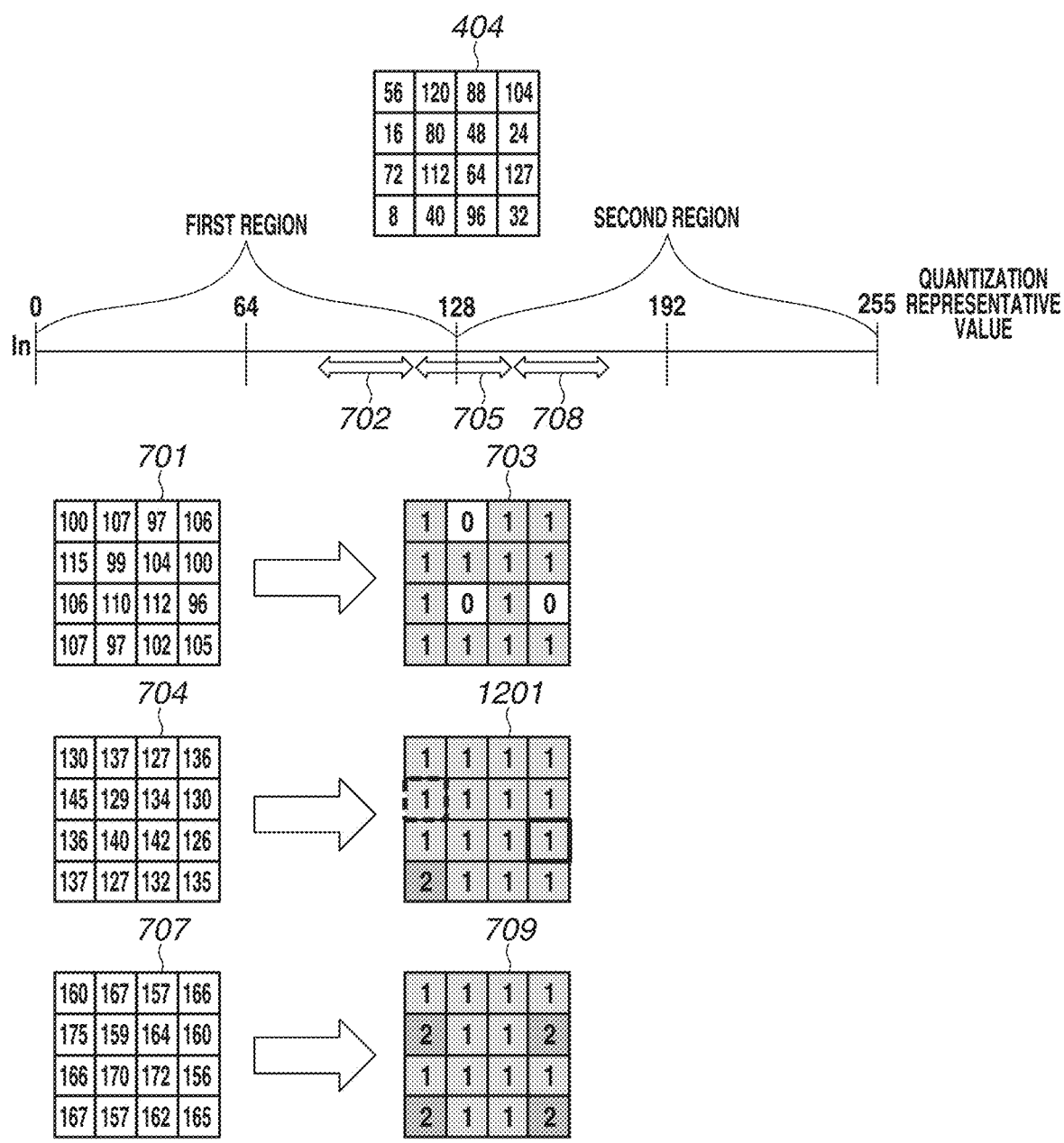
FIG. 12 is a diagram illustrating an example where the quantization boundary correction process according to the second exemplary embodiment is performed.

FIG. 12 illustrates an example of an effect of execution of the quantization correction process in FIG. 11. In a case where an image and a threshold value matrix condition are as in FIGS. 7 and 10, the pixel values of the input multi-valued data 704 are distributed over the region splitting boundary as in the range 705 and the difference between the maximum value and the minimum value is less than the determination threshold value JTh, so that the quantization correction process as illustrated in FIG. 11 is performed. A quantization result 1201 is output. In the quantization result 1201, as in the quantization result 1001, a quantization result of a pixel with a thick black frame is updated from level 0 to level 1. Further, a quantization result of a pixel with a dotted black frame is updated from level 2 to level 1. As in the quantization result 1001, the quantization results in the plurality-of-pixel region are corrected to two types. Furthermore, the total value of the quantization result 706 is (1+1+1+1+2+1+1+1+1+1+0+2+1+1+1)=17, which is the same as the total value of the quantization result 1201, which is (1+1+1+1+1+1+1+1+1+1+1+2+1+1+1)=17. The quantization result 1201 is improved in granularity compared to the quantization result 706 and, furthermore, the density of the pixel region is maintained. The present exemplary embodiment improves the granularity and maintains the density.

The present exemplary embodiment improves the granularity of a result of recording by the inkjet recording apparatus while maintaining the density of the pixel region and prevents a density inversion between adjacent regions in a gradation portion.

While the correction in step S1105 is performed based on the pixel order of the loop counter i in FIG. 11 according to the present exemplary embodiment, a method and an execution order are not limited to those described above.

For example, in step S1104, the priority is set in descending order of values of pixels that are under a condition where Ni=RANK[1], in an ascending order of dither threshold values of corresponding positions, or both. The correction in step S1105 can be performed in descending order of ranks based on the set priority.

Further, according to the present exemplary embodiment, the counter j is increased by one in updating a quantization result from the point of view of improving granularity during steps S907 to S910. A method and execution order of setting the value of the counter j are also not limited to those described above.

For example, the total value of quantization levels in a region is calculated by using a value obtained by averaging input multi-valued data in the region, and comparing the mean value and the dither threshold value Dth. The difference value between the calculation result and the total value of the quantization result that is output in steps S907 to S910 can be stored in the counter j.

In a case where input multi-valued data changes as illustrated in FIG. 5, there are a high-granularity region where the input multi-valued data In is 0<In<128 or 128<In <255 and a low-granularity region where the input multi-valued data In is 0, 128, or 255. With gradations with a uniform quantization value, equal dot patterns are repeatedly arranged, so that the granularity is significantly low compared to neighboring gradations.

In order to smooth the granularity between gradations while maintaining blue noise characteristics, the dither threshold value Dth is enhanced so that a region is enlarged to be larger than a dither threshold value gradation region.

A quantization result is calculated based on two-level determination using the enhanced dither threshold value Dth and a predetermined value. A control method in quantization is devised to produce gradations that produce three types of quantization values, and this creates a state where the granularity is uniformly high regardless of an input gradation. From a state where the granularity is significantly low, the granularity is uniformly increased so that the granularity is smoothed between gradations, and a significant change in granularity between adjacent gradation portions is prevented. This method, however, raises an issue that the granularity is generally visible. According to the present exemplary embodiment, the processing of reducing the overall granularity is performed.

FIG. 13 is flowchart illustrating a conventional multi-value quantization process according to a comparative example. FIG. 13 illustrates a feature of a conventional multi-value quantization process in comparison with FIG. 6. Redundant descriptions of points that are similar to those described in the first exemplary embodiment are omitted.

In step S1301, the dither threshold value Dth is normalized to a dither threshold value Dth' so that the maximum value becomes a maximum value X. While the dither threshold value gradation region is 0 to 127 in the examples illustrated in FIGS. 7, 10, and 12, in a case where, for example, the maximum value X is set to 256, each dither threshold value is normalized by 255/127.

In step S1302, the comparative multi-valued data In' acquired in step S602 and the dither threshold value Dth' acquired in step S1301 are compared. In a case where In' ≥Dth' (YES in step S1302), the processing proceeds to step S1303, and a value obtained by adding one to the provisional quantization value N' is determined as a quantization value (N=N'+1), and the process ends. On the other hand, in a case where In'<Dth' (NO in step S1302), the processing proceeds to step S1304.

In step S1304, the comparative multi-valued data In' acquired in step S602 and the dither threshold value Dth' acquired in step S1301 are compared using a predetermined value a. The comparative multi-valued data In' is compared with a value (Dth'-α) obtained by subtracting the predetermined value a from the enhanced dither threshold value Dth'. In a case where In'≥(Dth'-α)(YES in step S1304), the processing proceeds to step S1305. On the other hand, in a case where In'<(Dth'-α) (NO in step S1304), the processing proceeds to step S1306.

In step S1305, the provisional quantization value N' is determined as a quantization value (N=N'), and the process ends.

In step S1306, a value obtained by subtracting one from the provisional quantization value N' is determined as a quantization value (N=N'-1), and the process ends.

Figure 14A:
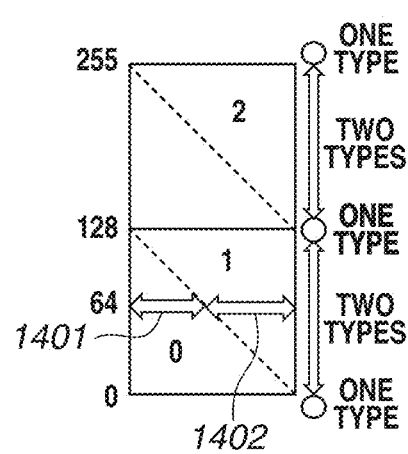
FIGS. 14A to 14B are diagrams illustrating quantization results according to Japanese Patent Application Laid-Open No. 2016-154326.
Figure 14B:
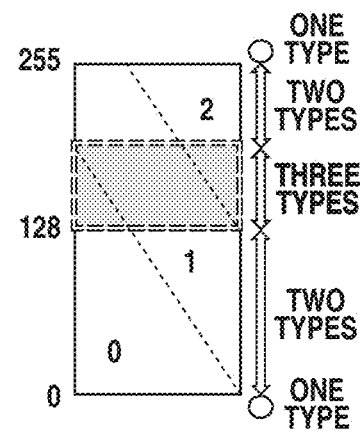
Figure 14C:
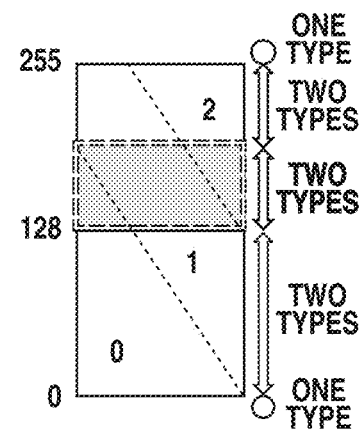
FIG. 14C is a diagram illustrating an example where a quantization correction process according to a third exemplary embodiment is performed.

FIGS. 14A to 14C are diagrams illustrating an effect of a conventional technique. FIG. 14A illustrates a result obtained by the normal multi-value quantization, and FIG. 14B illustrates a result obtained by executing the multi-value quantization illustrated in the flowchart in FIG. 13.

In FIGS. 14A and 14B, each vertical axis indicates a transition of the input multi-valued data In, and a result increasing in value from the bottom to the top is illustrated. Each horizontal axis indicates the probability of occurrence of quantization levels, and a larger lateral length indicates a higher probability of occurrence of the corresponding quantization level. For example, lengths 1401 and 1402 in FIG. 14A respectively indicate the probabilities of occurrence of level 0 and level 1 for the dither threshold value when the input multi-valued data In=64.

In FIG. 14A, when the input multi-valued data In is zero, the quantization level is zero regardless of the dither threshold value. As the input multi-valued data In increases, the quantization level of 1 occurs, and when the input multi-valued data In is 128, the quantization level is 1 regardless of the dither threshold value. As the input multi-valued data In further increases, the quantization level of 2 occurs, and when the input multi-valued data In is 255, the quantization level is 2 regardless of the dither threshold value. A transition of the quantization result when the input values of the entire pixel region are the same is illustrated on the right. When the input multi-valued data In is 0, 128, or 255, there is one uniform quantization value. When the input multi-valued data In is 0<In<128 or 128<In<255, the quantization value is one of the two quantization values.

FIG. 14B illustrates an effect of a conventional technique. The dither threshold value Dth is enhanced, and the determination processing including the predetermined value a is performed, whereby the distribution of the occurrences of the quantization levels is changed. In a frame surrounded by a bold dotted line in FIG. 14B, there are three types of quantization results for the input multi-valued data In as a result of the processing of steps S1302 to S1306. A transition of the quantization result when the input values of the entire pixel region are the same is illustrated on the right. In the region where there is one uniform quantization value in FIG. 14A, three quantization values are obtained in FIG. 14B. Thus, significant changes in granularity are not likely to occur, but the granularity becomes visible.

By combining with the present case, a quantization result as illustrated in FIG. 14C is obtained. The region where three quantization values are obtained are limited to two types so that changes in granularity of a recorded image are reduced and the granularity improves.

FIG. 15 is a diagram illustrating a quantization correction process according to the present exemplary embodiment. The process is performed based on the determination result of step S809 in the determination process in FIG. 8. Redundant descriptions that are similar to those described above in the first exemplary embodiment are omitted.

In step S1501, steps S601, S602, and S1301 to S1306 in the flowchart in FIG. 13 are performed for the ith pixel. As a result, the quantization result Ni for the ith pixel is output.

As described above, according to the present exemplary embodiment, the granularity is smoothed while the granularity is reduced.

While the quantization correction process in FIG. 15 is performed based on the process in FIG. 9A, the quantization correction process can be performed based on the process in FIG. 11 according to the second exemplary embodiment.

Further, while the entire process in FIG. 3 is performed by the image processing apparatus 2 in the above-described exemplary embodiments, each of the processes can be performed by any of the devices of the inkjet recording system in FIG. 1 according to the present exemplary embodiment. For example, the process up to the quantization in step S305 can be performed by the image processing apparatus 2, and the index development in step S306 can be performed by the recording apparatus 1. Further, the recording apparatus 1 can include the above-described functions of the image processing apparatus 2 and perform all the steps from step S301. In this case, the recording apparatus 1 is an image processing apparatus according to an aspect of the disclosure.

Further, the number of bits of input/output is not limited to those described in the exemplary embodiment. The number of output bits can be greater than the number of input bits in order to maintain accuracy, and the number of bits can be adjusted as desired based on a purpose of use or a situation.

A program for realizing one or more functions according to the above-described exemplary embodiments can be supplied to a system or an apparatus via a network or a storage medium, and one or more processors of a computer of the system or the apparatus can read the program and execute the read program. Further, the disclosure may also be realized by a circuit (e.g., application-specific integrated circuit (ASIC)) that performs one or more functions.

Further, while the inkjet recording apparatus is used as a configuration for recording a dithered image, the recording method is not limited to the inkjet recording method. Any recording method by which each pixel expresses a plurality of density levels corresponding to levels after multi-value quantization can be employed. For example, laser output values of an electrophotographic apparatus for image recording are adjusted in several levels so that each pixel represents a density corresponding to a level after quantization.

The disclosure prevents an increase in granularity of a recorded image even in a case where there is a small amplitude of pixel values in a region of the image.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-198747, filed Nov. 30, 2020, which is hereby incorporated by reference herein in its entirety.

What is claimed is:

1. An image processing apparatus comprising:
one or more processors and at least one memory in a recording apparatus having ink with ink colors, the at least one memory being coupled to the one or more processors and having stored thereon instructions executable by the one or more processors, wherein at least one of the one or more circuits or the execution of the instructions cause the image processing apparatus to function as:
an inputting unit configured to input image data having a plurality of pixels in a region of interest, the plurality of pixels corresponding to ink colors in the recording apparatus,
a color separation unit configured to separate the image data into N-gradation multi-valued data of each ink color of the recording apparatus, where N≥4, representing pixel values of the plurality of pixels,
a determination unit configured to determine whether the pixel values have a split distribution in which the pixel values are distributed, in a predetermined range, over two adjacent split regions separated by a quantization representative threshold, and
a generation unit configured to generate M-gradation quantization data represented by an M-gradation quantization value, where 3≤M<N, based on the N-gradation multi-valued data and the split distribution,
wherein in a case where the pixel values have the split distribution, the generation unit generates the M-gradation quantization data in a correction process so that each of almost all the plurality of pixels has a value that is one of two consecutive values of the M-gradation quantization values, and has no value other than the two consecutive values among the M-gradation quantization values, in the generated M-gradation quantization data, and records the M-gradation quantization values on a recording medium.

2. The image processing apparatus according to claim 1, wherein in a case where the pixel values do not have the split distribution, the generation unit generates the M-gradation quantization data in a normal process so that each of the plurality of pixels corresponding to the region of interest has a value that is one of M−1 consecutive values of the M-gradation quantization values.

3. The image processing apparatus according to claim 1, wherein the correction process includes a normal process and an update process.

4. The image processing apparatus according to claim 3, wherein in the normal process, the generation unit calculates comparative multivalued data and provisional quantization values from the N-gradation multi-valued data and the quantization representative threshold and generate initial quantization values based on the provisional quantization values and a comparison between the comparative multivalued data and corresponding dither threshold values.

5. The image processing apparatus according to claim 4, wherein in the update process, the generation unit: (1) creates a histogram of the initial quantization values, (2) sorts the histogram in descending order into a rank array, (3) determines if there is a match between one of the initial quantization values and a third component of the rank array, and (4) updates the one of the initial quantization values with a first component of the rank array if there is a match.

6. The image processing apparatus according to claim 4, wherein in the normal process, the generation unit calculates the provisional quantization values as quotients of a division of the N-gradation multi-valued data and the quantization representative threshold, and the comparative multivalued data as remainders of the division.

7. The image processing apparatus according to claim 4, wherein in the normal process, the generation unit generates the initial quantization values to be (1) equal to corresponding provisional quantization values if the comparative multivalued data are less than the corresponding dither threshold values, and (2) equal to the corresponding provisional quantization values plus one if the comparative multivalued data are greater than or equal to the corresponding dither threshold values.

8. The image processing apparatus according to claim 1 wherein M=3.

9. The image processing apparatus according to claim 8 wherein the quantization representative threshold is equal to 128.

10. The image processing apparatus according to claim 1, wherein the predetermined range is smaller than a range of a gradation value corresponding to a split region.

11. The image processing apparatus according to claim 1, wherein in the split distribution, a maximum value of the pixel values and a minimum value of the pixel values are included in the predetermined range.

12. An image processing method used in a recording apparatus having ink with ink colors, the method comprising:
inputting image data having a plurality of pixels in a region of interest, the plurality of pixels corresponding to ink colors in the recording apparatus;
separating the image data into N-gradation multi-valued data of each ink color of the recording apparatus, where N≥4, representing pixel values of the plurality of pixels;
determining whether the pixel values have a split distribution in which the pixel values are distributed, in a predetermined range, over two adjacent split regions separated by a quantization representative threshold; and
generating M-gradation quantization data represented by an M-gradation quantization value, where 3≤M<N, based on the N-gradation multi-valued data and the split distribution,
wherein in a case where the pixel values have the split distribution, the M-gradation quantization data is generated in a correction process so that each of almost all the plurality of pixels has a value that is one of two consecutive values of the M-gradation quantization values, and has no value other than the two consecutive values among the M-gradation quantization values, in the generated M-gradation quantization data, and records the M-gradation quantization values on a recording medium.

13. A non-transitory, computer-readable storage medium storing a program for causing a computer to execute the image processing method according to claim 12.

14. The image processing method according to claim 12, wherein in a case where the pixel values do not have the split distribution, the M-gradation quantization data is generated in a normal process so that each of the plurality of pixels corresponding to the region of interest has a value that is one of M−1 consecutive values of the M-gradation quantization values.

15. The image processing method according to claim 12, wherein the correction process includes a normal process and an update process.

16. The image processing method according to claim 15, wherein in the normal process, comparative multivalued data and provisional quantization values are calculated from the N-gradation multi-valued data and the quantization representative threshold, and initial quantization values are generated based on the provisional quantization values and a comparison between the comparative multivalued data and corresponding dither threshold values.

17. The image processing method according to claim 15, wherein in the update process, the generation unit: (1) creates a histogram of the initial quantization values, (2) sorts the histogram in descending order into a rank array, (3) determines if there is a match between one of the initial quantization values and a third component of the rank array, and (4) updates the one of the initial quantization values with a first component of the rank array if there is a match.

18. The image processing method according to claim 16, wherein in the normal process, the provisional quantization values are calculated as quotients of divisions of the N-gradation multi-valued data and the quantization representative threshold, and the comparative multivalued data are calculated as remainders of the divisions.

19. The image processing method according to claim 16, wherein in the normal process, the initial quantization values are generated to be (1) equal to corresponding provisional quantization values if the comparative multivalued data are less than the corresponding dither threshold values, and (2) equal to the corresponding provisional quantization values plus one if the comparative multivalued data are greater than or equal to the corresponding dither threshold values.

20. The image processing method according to claim 16, wherein in the normal process, the initial quantization values are generated to be (1) equal to corresponding provisional quantization values if the comparative multivalued data are less than the corresponding dither threshold values, and (2) equal to the corresponding provisional quantization values plus one if the comparative multivalued data are greater than or equal to the corresponding dither threshold values.

21. The image processing method according to claim 12 wherein M=3.

22. The image processing method according to claim 21 wherein the quantization representative threshold is equal to 128.

\* \* \* \* \*